United States Patent
Armstrong et al.

(10) Patent No.: US 6,926,110 B2
(45) Date of Patent: Aug. 9, 2005

(54) OIL TANK COVER

(75) Inventors: Jeffrey L. Armstrong, Fredonia, WI (US); Scott W. Matthews, Franklin, WI (US)

(73) Assignee: Harley Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 10/617,537

(22) Filed: Jul. 11, 2003

(65) Prior Publication Data

US 2005/0006161 A1 Jan. 13, 2005

(51) Int. Cl.$^7$ ................. B62K 11/00; B65D 65/02
(52) U.S. Cl. ............... 180/219; 296/136.07; D12/126
(58) Field of Search ............ 180/219; 296/136.07; D12/114, 126

(56) References Cited

U.S. PATENT DOCUMENTS

| | | | | |
|---|---|---|---|---|
| 4,469,256 A | * | 9/1984 | McEwen | 224/413 |
| 4,596,301 A | * | 6/1986 | Nagashima | 180/215 |
| D294,920 S | * | 3/1988 | Nagy | D12/126 |
| 5,490,549 A | * | 2/1996 | Biette | 150/167 |
| 5,884,380 A | * | 3/1999 | Thurm | 29/401.1 |
| D485,216 S | * | 1/2004 | Yamamoto et al. | D12/126 |

FOREIGN PATENT DOCUMENTS

| | | | | |
|---|---|---|---|---|
| EP | 1066949 A | * | 7/2000 | B29C/49/00 |
| JP | 07291169 A | * | 11/1995 | B62J/35/00 |

OTHER PUBLICATIONS

Custom Chrome, 1989 Catalog, Jan. 1, 1989, pp. 395–399.

* cited by examiner

*Primary Examiner*—Kevin Hurley
(74) *Attorney, Agent, or Firm*—Michael Best & Friedrich LLP

(57) ABSTRACT

A motorcycle comprising a frame, a front wheel coupled to the frame, and a rear wheel coupled to the frame. An engine is coupled to the frame and adapted to propel the motorcycle. An oil tank is coupled to the frame and adapted to contain oil used to lubricate the engine. The oil tank has an exposed surface. A cover is removably coupled to at least one of the frame and the oil tank to substantially cover the exposed surface of the oil tank.

13 Claims, 9 Drawing Sheets

OIL TANK COVER

BACKGROUND OF THE INVENTION

The present invention generally relates to motorcycles, and particularly to motorcycles that include lubricating oil systems.

Some motorcycles include a lubricating oil system that uses a tank to store oil for use. The tank is commonly supported by the motorcycle frame and is often highly visible. Because the tank is visible, it is often manufactured from metal to improve the aesthetic appeal of the motorcycle and to protect the tank from damage from flying debris such as rocks. Unfortunately, the manufacture of a metallic oil tank can be costly.

Plastic tanks can be used in place of metal tanks to contain oil. However, plastic tanks are not as aesthetically pleasing and can be difficult to finish (e.g., chrome plate, paint, etc.). In addition, plastic tanks often do not have the durability of a metal tank.

SUMMARY OF THE PREFERRED EMBODIMENT

The present invention provides a motorcycle including an oil tank that contains and stores oil for use in lubricating the motorcycle engine. A cover attaches to the motorcycle frame or to the oil tank to cover the exposed surface of the oil tank. The cover is preferably formed from metal while the oil tank is preferably formed from plastic.

BRIEF DESCRIPTION OF THE DRAWINGS

The detailed description particularly refers to the accompanying figures in which.

Figure 1:
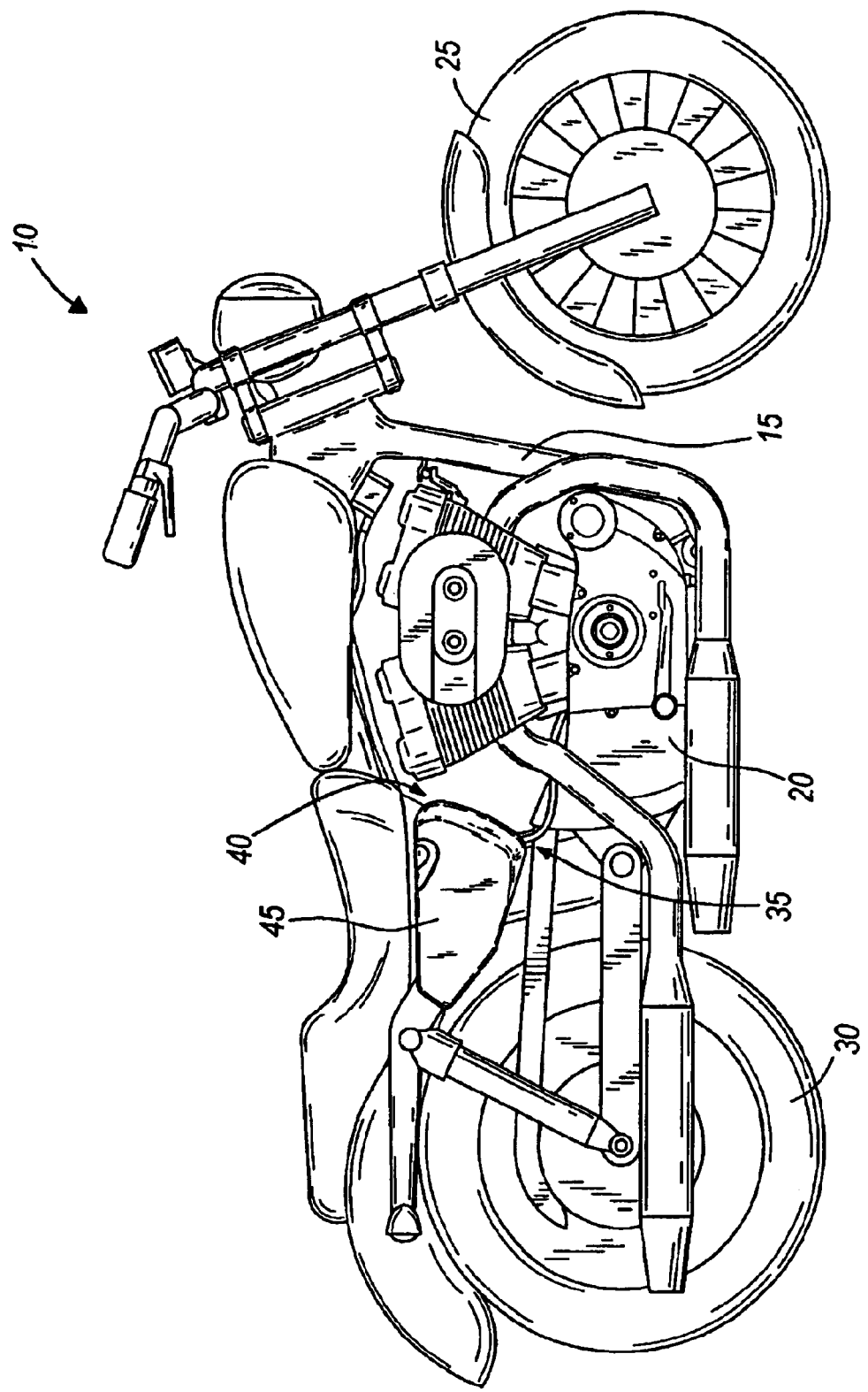
FIG. 1 is a right side view of a motorcycle including an oil system.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "having", "including", and "comprising" and variations thereof herein is meant to encompass the items listed thereafter and equivalents thereof as well as additional items. The use of letters to identify elements of a method or process is simply for identification and is not meant to indicate that the elements should be performed in a particular order.

DETAILED DESCRIPTION OF THE DRAWINGS

FIG. 1 illustrates a motorcycle 10 including a frame 15 that supports an engine/transmission assembly 20, a front wheel 25, and a rear wheel 30. The front wheel 25 is pivotally coupled to the frame 15 to allow a rider to steer the motorcycle 10. The rear wheel 30 is coupled to the engine/transmission assembly 20 such that operation of the engine/transmission assembly 20 rotates the rear wheel 30 to propel the motorcycle 10.

Figure 2:
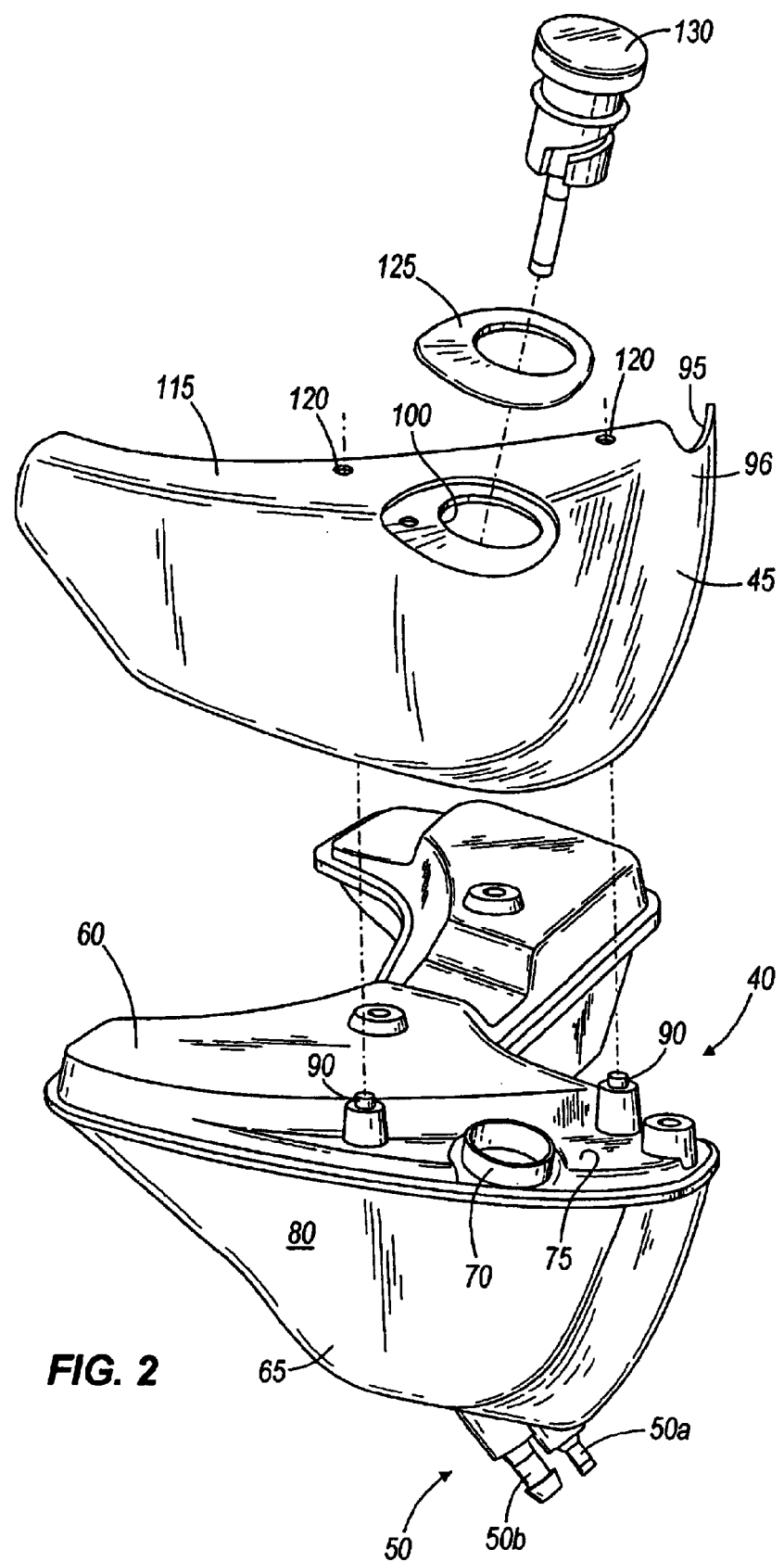
FIG. 2 is an exploded view of a portion of the oil system of FIG. 1 including an oil tank cover embodying the present invention.
Figure 7:
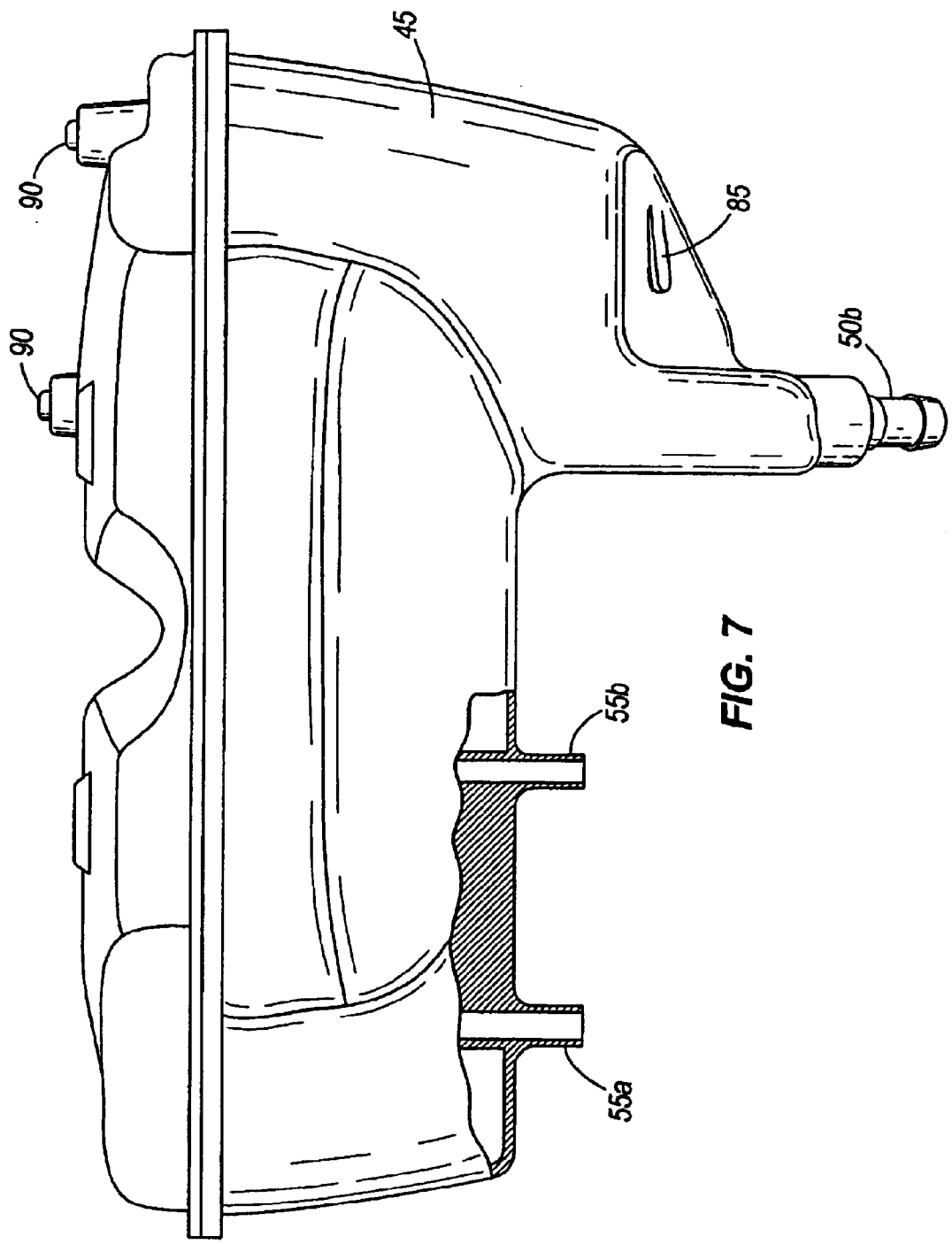
FIG. 7 is a partially broken away rear view of the oil tank of FIG. 2.

The motorcycle 10 also includes a lubrication oil system 35 having an oil tank 40 suited to the storage of oil and a cover 45 covering at least a portion of the oil tank 40. The oil tank 40 attaches to the frame 15 or a support member that supports the oil tank 40 in a substantially fixed position relative to the frame 15. Referring to FIG. 2, the oil tank 40 includes a first oil outlet 50a that directs oil to the engine for use and a second oil outlet 50b that is used to drain the oil tank 40 to change the oil. Referring to FIG. 7, a first inlet 55a allows oil to return to the tank 40 from the engine after it is used, and a second inlet 55b acts as a vent to prevent over or under pressurization of the oil tank 40 during operation. The tank 40 may also include baffles or other similar devices that allow the oil time to cool and de-aerate before being routed back to the engine 20.

Returning to FIG. 2, the oil tank 40 illustrated includes a top 60 that attaches to a base 65 to define the completed tank 40. Other oil tank constructions are formed as a single complete piece without the need for a separate top 60. The oil tank 40 can be formed from any suitable material (e.g., plastic, metal, composite, and the like) with plastics being preferred. The use of plastics allows for the manufacture of the tank 40 using injection molding, blow molding, roto-molding or other like mass production processes. The use of these processes reduces the overall cost of the oil tank 40 when compared to a fabricated metal or composite tank.

The oil tank 40 also includes an inlet or fill spout 70. The fill spout 70 extends beyond an outer surface 75 of the tank 40 to a position that allows a user to fill the oil tank with oil.

Once attached to the motorcycle 10, the oil tank 40 defines an exposed surface 80. The exposed surface 80 may be a single planar or non-planar surface, several surfaces, or portions of one or more surfaces. The exposed surface 80 can include the area of the tank 40 that is visible from the side, front, rear, or bottom of the motorcycle 10.

The base 65 of the oil tank 40 includes a lower protrusion 85 (FIG. 7) that is positioned to aid in the attachment of the cover 45 to the oil tank 40. As shown in FIG. 7, the protrusion is a substantially rectangular ramp-shaped extension of the tank 40. The ramp shape aids in the installation of the cover 45 by allowing the cover 45 to slide along the ramp as it is installed. In another construction, the protrusion 85 is formed as part of an aperture (e.g., oil outlet aperture 50, oil inlet or vent 55, and the like) that is already required for the tank 40 to function. The combination of the protrusion 85 with an aperture has the advantage of eliminating the need for an extra protrusion.

The top 60 of the oil tank 40 includes two protrusions 90 that also aid in the attachment of the cover 45 to the oil tank 40. The protrusions 90 in the top 60 of the oil tank 40 are formed as part of the oil tank top 60.

Figure 3:
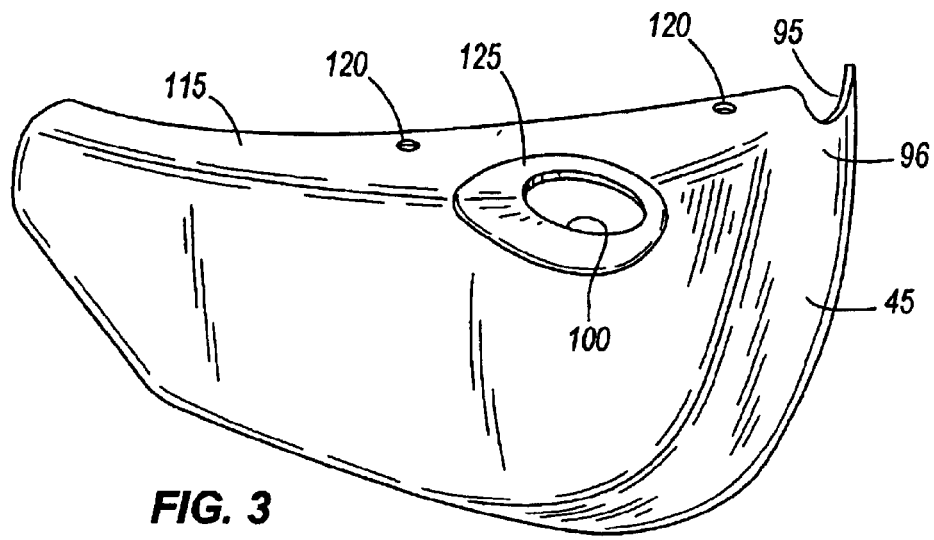
FIG. 3 is a perspective view of the oil tank cover of FIG. 2.
Figure 4:
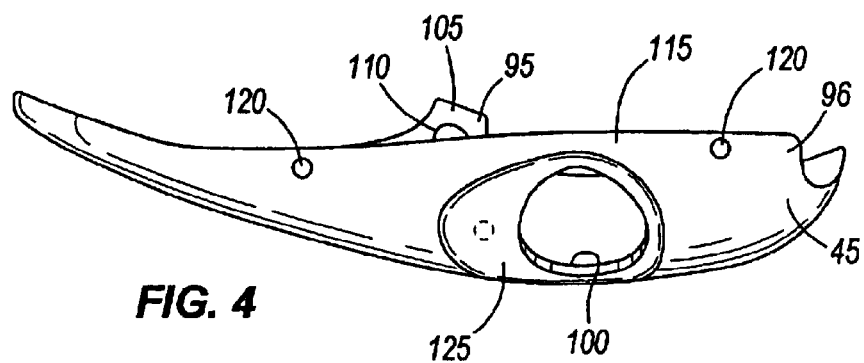
FIG. 4 is a top view of the oil tank cover of FIG. 2.
Figure 5:
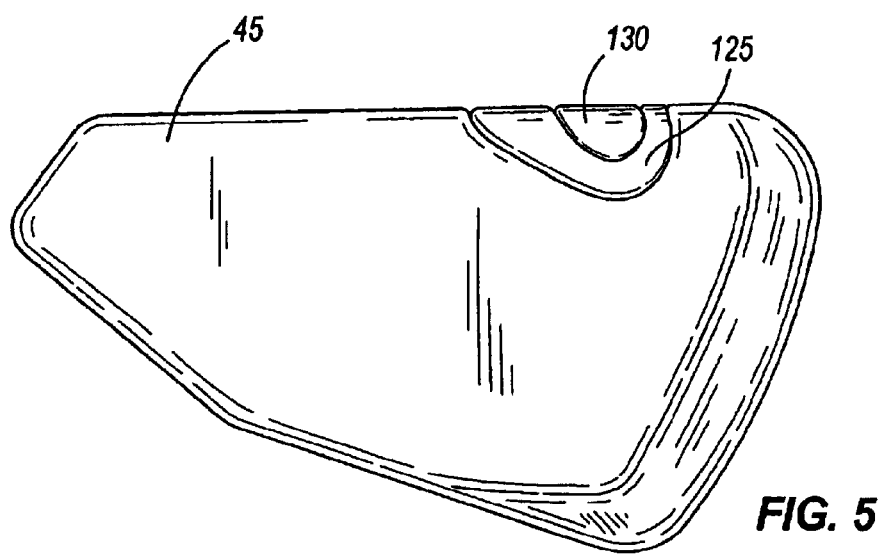
FIG. 5 is a right side view of the oil tank cover of FIG. 2.

As shown in FIGS. 3–5, the cover 45 is a contoured member, or contoured wall portion, having an inner surface 95 that faces the oil tank 40 when the cover 45 is installed and an outer or exposed portion 96. The contours of the cover 45 serve to not only cover a significant portion of the exposed surface 80 but also provide an aesthetic shape that is pleasing to look at. Thus, smooth curves and large fillets transition between surfaces. While many materials (e.g., plastics, composites, and the like) are suitable for use in manufacturing the cover, metal is preferred.

Figure 6:
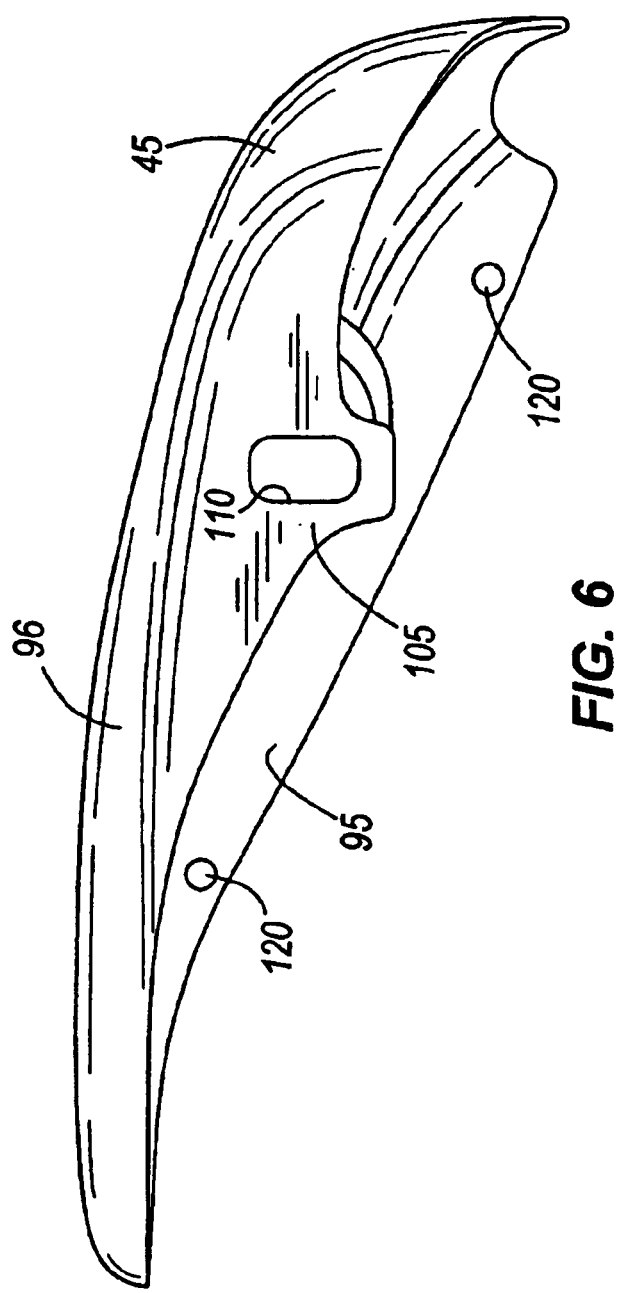
FIG. 6 is a bottom view of the oil tank cover of FIG. 2.

The cover 45 also includes an aperture 100 that is sized and positioned to receive the fill spout 70 when the cover 45 is positioned over the tank 40. The cover 45 also includes a lower attachment portion 105, or lower portion, having a lower aperture 110 or attachment point, shown in FIG. 6, that receives the lower protrusion 85. Opposite the lower attachment portion 105 is an upper attachment portion 115, or upper portion, having two upper apertures 120, or attachment points, that receive the top protrusions 90. The upper attachment portion 115 and lower attachment portion 105 are positioned a distance from one another and extend at an angle from a majority of the exposed surface 80.

To engage the cover 45, the upper apertures 120 are placed over the top protrusions 90. The cover 45 is then rotated until the lower attachment portion 105 engages the lower protrusion 85. As the cover 45 is further rotated, the lower attachment portion 105 moves along the lower protrusion 85 such that the upper attachment portion 115 separates slightly from the lower attachment portion 105. Once the cover reaches its final position, the lower aperture 110 fully engages the lower protrusion 85. The separation between the upper attachment portion 115 and the lower attachment portion 105 creates a biasing force that allows the cover 45 to squeeze the oil tank 40 and remain in place. Once the protrusions 85, 90 engage the apertures 110, 120 the cover 45 is fixed relative to the oil tank 40, unless removed by the user.

Many different attachment methods are suited to attaching the cover 45 to the tank 40 and are contemplated by the present invention. As such, the invention should not be limited to the few examples discussed herein. The actual method of attachment is unimportant so long as the cover 45 is firmly held in a position that allows the cover 45 to cover at least a portion of the exposed surface 80 of the oil tank 40. For example, in other constructions, the protrusions 85, 90 are positioned on the cover 45 with recesses or apertures 110, 120 located on the oil tank 40. In still other constructions, a combination of recesses and protrusions are located on each of the cover 45 and the oil tank 40. Furthermore, other constructions may include more attachment points (i.e., protrusion and recess combinations) than the three described herein. In yet another construction, fasteners are used to attach the cover to the oil tank. Fasteners suited to the purpose could include screws, studs and nuts and the like, or could include slot and hook arrangements that engage one another to attach the cover 45 to the oil tank 40. In another construction, the cover 45 attaches to a component on the motorcycle 10 other than the oil tank 40.

A bezel 125, illustrated best in FIG. 2, attaches to the cover 45 to provide a more appealing visual appearance to the aperture 100 in the cover 45. The bezel 125 is contoured to match the contours of the cover 45 to provide a substantially smooth transition between the components 45, 125.

To complete the oil tank and cover assembly, a cap 130 is inserted into the fill spout 70. The cap 130 seals the opening to prevent oil from spilling out of the tank 40 and to prevent dirt or water from entering the tank 40. Like the bezel 125, the cap 130 is contoured to blend in with the contours of the cover 45 to improve the aesthetic appearance of the motorcycle 10. In addition, by blending the cap 130 with the surrounding surfaces, the cap 130 is less likely to get bumped or damaged during use of the motorcycle 10. The cap 130 is sized to pass through the bezel 125 and the cover 45 and engage the oil tank 40 itself. Thus, the cap 130 can be inserted and removed without removing the cover 45.

Figure 8:
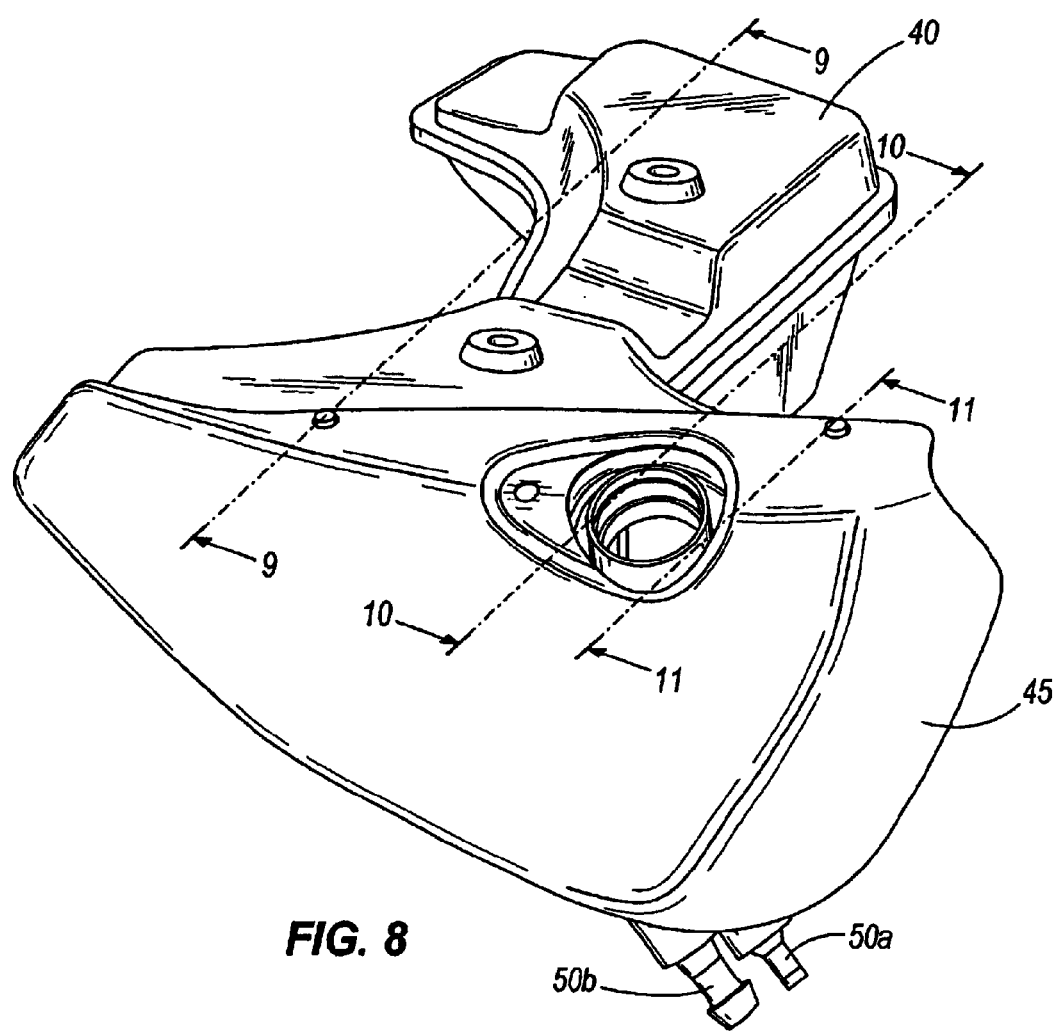
FIG. 8 is a perspective view of the oil tank of FIG. 7 with the cover of FIG. 3 attached.
Figure 9:
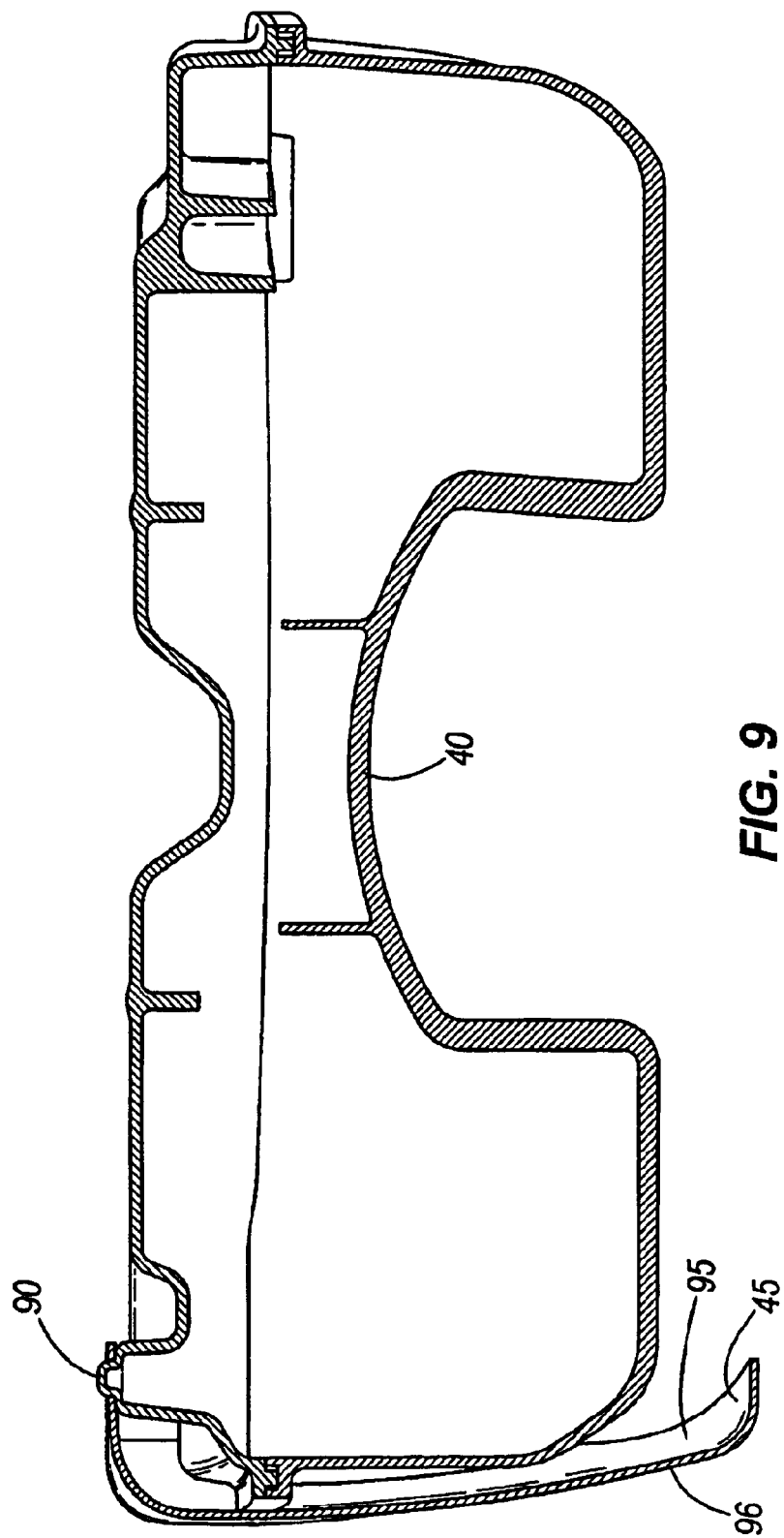
FIG. 9 is a section view taken along line 9—9 of FIG. 8.
Figure 10:
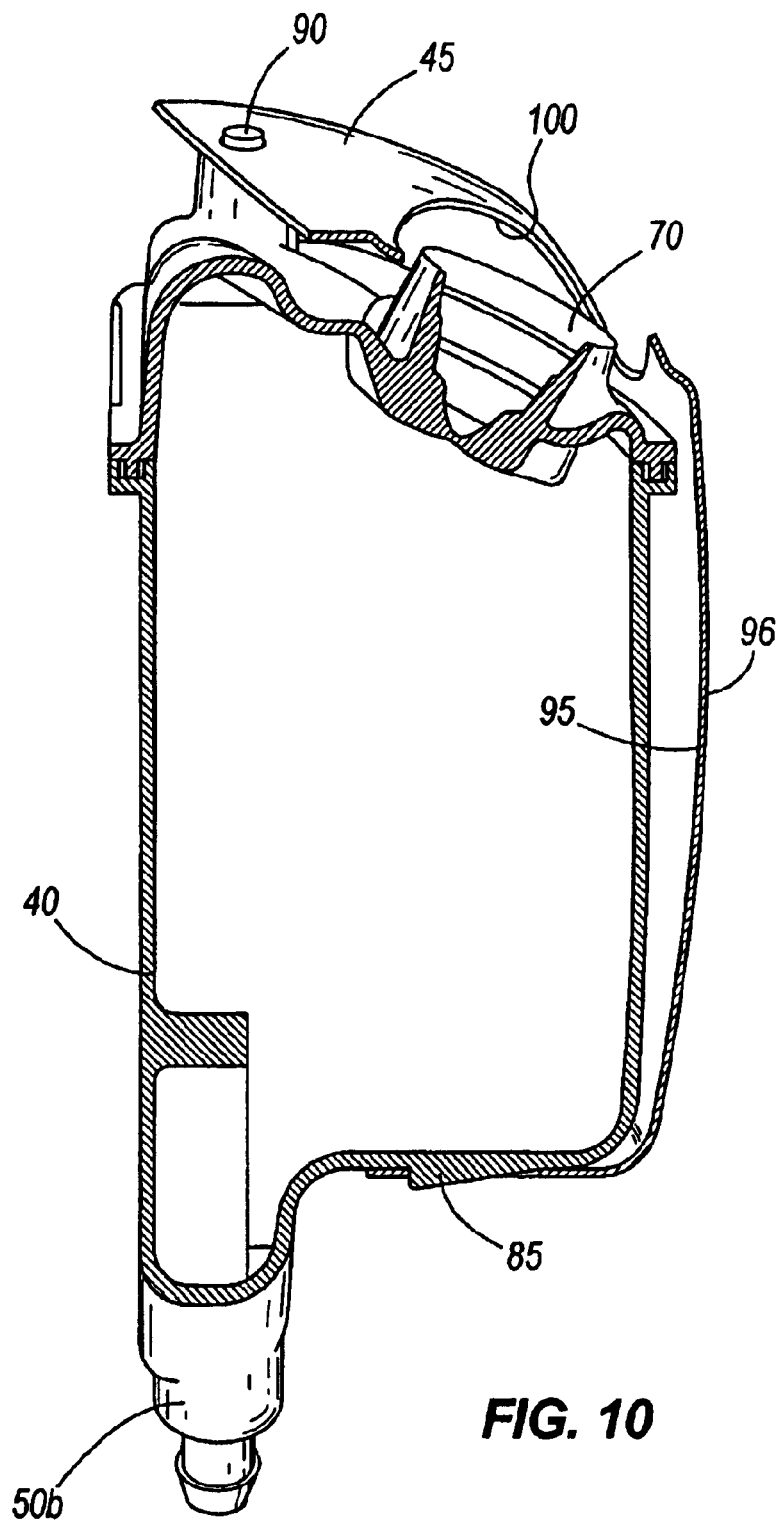
FIG. 10 is a section view taken along line 10—10 of FIG. 8.
Figure 11:
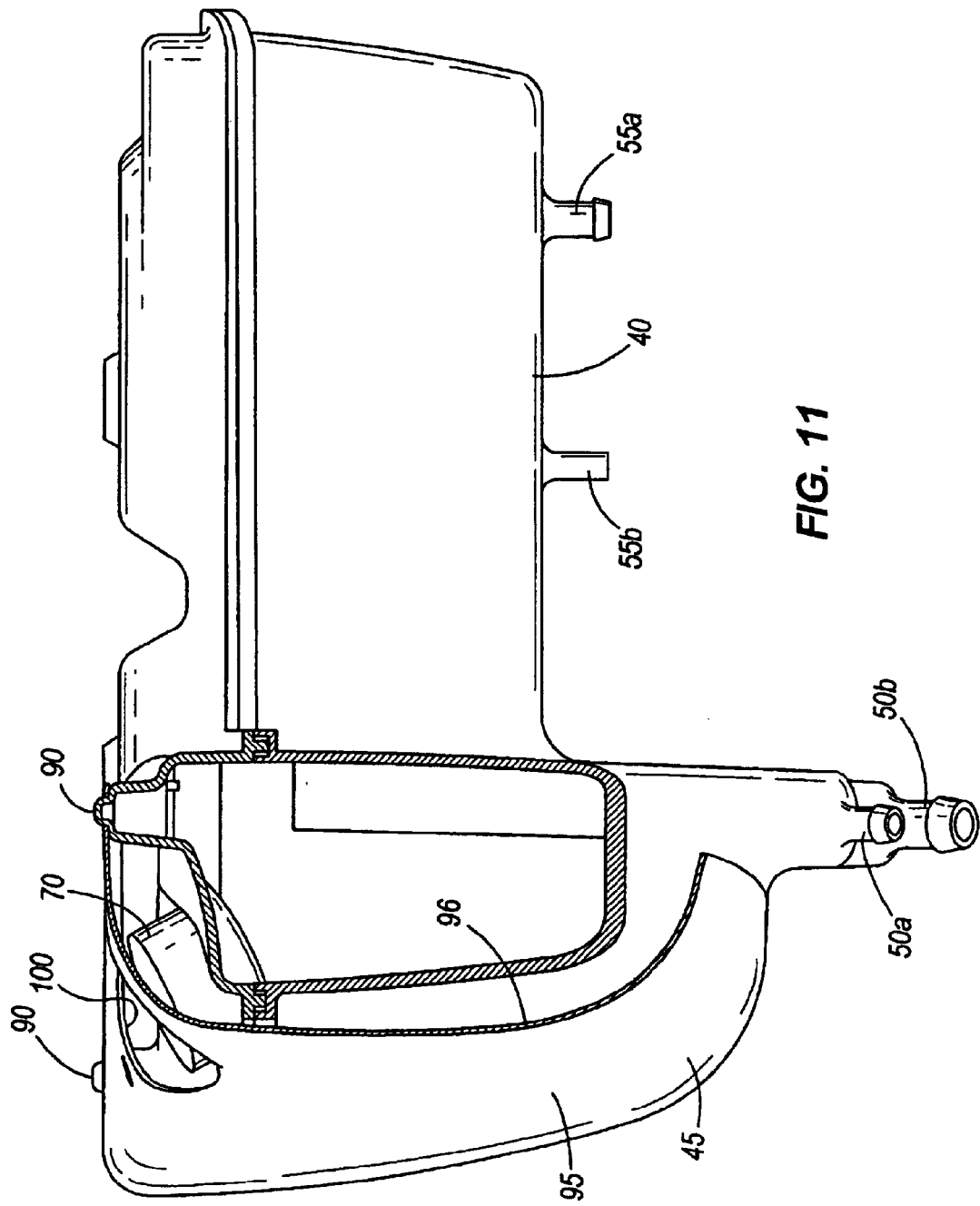
FIG. 11 is a section view taken along line 11—11 of FIG. 8.

FIG. 8 illustrates the cover 45 attached to the oil tank 40. FIGS. 9–11 are section views taken along various lines of FIG. 8 to better illustrate the cover's position relative to the oil tank 40 and the attachment method employed to connect the two components. For example, FIG. 9 shows the engagement of one of the top protrusions 90 with the cover 45. FIG. 10 illustrates the engagement of the lower protrusion 85 with the cover 45. Also shown is one of the top protrusions 90 engaged with the cover 45 and the fill spout 70 positioned beneath the aperture 100. FIG. 11 is a section view taken through the second top protrusion 90. Again, FIG. 11 better illustrates the relationship between the cover 45 and the oil tank 40.

Although the invention has been described in detail with reference to certain preferred embodiments, variations and modifications exist within the scope and spirit of the invention as described and defined in the following claims.

What is claimed is:

1. A cover for a motorcycle oil tank assembly including an exposed surface, an inlet having an inlet aperture, and an oil cap removably engaged with the inlet and substantially sealing the inlet aperture, the cover comprising:

a contoured wall portion defining an upper attachment portion, a lower attachment portion, and an inner surface, the upper attachment portion including a first aperture that is engageable with a first oil tank protrusion and the lower attachment portion including a second aperture that is engageable with a second oil tank protrusion to connect the contoured wall to the oil tank without the use of fasteners such that the inner surface faces the exposed surface and the contoured wall portion substantially covers the exposed surface of the oil tank, wherein the contoured wall portion is substantially formed from a metallic material.

2. The cover of claim 1, wherein the contoured wall portion includes an aperture adapted to allow access to at least a portion of the oil cap when the contoured wall is attached to the oil tank.

3. The cover of claim 1, wherein the upper attachment portion includes a third aperture that is engageable with a third oil tank protrusion.

4. The cover of claim 3, wherein the first aperture, the second aperture, and the third aperture provide the sole attachments between the contoured wall portion and the oil tank.

5. The cover of claim 3, wherein the first aperture and the second aperture are substantially circular and the third aperture is substantially oval.

6. A motorcycle comprising:
a frame;
a front wheel coupled to the frame;
a rear wheel coupled to the frame;
an engine coupled to the frame and adapted to propel the motorcycle;
a substantially plastic oil tank coupled to the frame and adapted to contain oil used to lubricate the engine, the oil tank having an exposed surface, an inlet having an inlet aperture, and an oil cap removably engaged with the inlet and substantially sealing the inlet aperture; and a substantially metallic cover including a contoured wall portion defining an inner surface, and an attachment point adapted to connect the contoured wall to the oil tank such that the inner surface is facing the exposed surface and the contoured wall portion substantially covers the exposed surface of the oil tank.

7. The motorcycle of claim 6, wherein the oil tank is injection molded.

8. The motorcycle of claim 6, wherein the cover is supported by the oil tank.

9. The motorcycle of claim 6, wherein the oil tank includes a first attachment surface and a second attachment surface, each of the attachment surfaces including at least one tank attachment member, and wherein the cover includes a first cover surface and a second cover surface, each of the cover surfaces including at least one cover attachment member, the cover attachment members engaged with the tank attachment members to attach the cover to the oil tank.

10. The motorcycle of claim 9, wherein each of the tank attachment members is one of a projection or a recess and wherein the corresponding cover attachment member is the other of the projection and the recess.

11. The motorcycle of claim 10, wherein the recesses are apertures.

12. A cover for a motorcycle oil tank assembly including an exposed surface, an inlet having an inlet aperture, and an oil cap removably engaged with the inlet and substantially sealing the inlet aperture, the cover comprising:

a contoured wall portion defining an upper attachment portion, a lower attachment portion, and an inner surface, the upper attachment portion including a first aperture that is engageable with a first oil tank protrusion and the lower attachment portion including a second aperture that is engageable with a second oil tank protrusion to connect the contoured wall to the oil tank without the use of fasteners such that the inner surface faces the exposed surface and the contoured wall portion substantially covers the exposed surface of the oil tank, wherein the upper attachment portion and the lower attachment portion are spaced apart a first distance when the cover is not attached to the oil tank, and the upper attachment portion and the lower attachment portion are spaced apart a second distance when the cover is attached to the oil tank, the second distance being greater than the first distance.

13. The cover of claim 12, wherein the contoured wall portion produces a biasing force when coupled to the oil tank, the biasing force squeezing the oil tank.

* * * * *